(12) United States Patent
Zhai

(10) Patent No.: US 10,580,227 B2
(45) Date of Patent: Mar. 3, 2020

(54) METHOD AND APPARATUS FOR TESTING OPERATION OF UNMANNED VEHICLE

(71) Applicant: BEIJING BAIDU NETCOM SCIENCE AND TECHNOLOGY CO., LTD., Beijing (CN)

(72) Inventor: Hong Zhai, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 450 days.

(21) Appl. No.: 15/424,074

(22) Filed: Feb. 3, 2017

(65) Prior Publication Data

US 2018/0033221 A1 Feb. 1, 2018

(30) Foreign Application Priority Data

Jul. 27, 2016 (CN) .......................... 2016 1 0603327

(51) Int. Cl.
  *G07C 5/08* (2006.01)
  *G08B 29/18* (2006.01)
  *G05D 1/02* (2006.01)
  *G06K 9/00* (2006.01)

(52) U.S. Cl.
  CPC ......... *G07C 5/0808* (2013.01); *G05D 1/0246* (2013.01); *G06K 9/00791* (2013.01); *G08B 29/18* (2013.01); *G05D 2201/0213* (2013.01)

(58) Field of Classification Search
  CPC ......... G05D 1/0246; G05D 2201/0213; G07C 5/0808; G06K 9/00791
  See application file for complete search history.

(56) References Cited

U.S. PATENT DOCUMENTS

| 9,442,487 B1 * | 9/2016 | Ferguson | ............. G08G 1/0104 |
| 9,892,332 B1 * | 2/2018 | Wendel | ............. G06K 9/00825 |
| 10,111,043 B1 * | 10/2018 | Cirit | ...................... H04W 4/029 |
| 2018/0211204 A1 * | 7/2018 | Bruns | .................. G06Q 10/087 |

FOREIGN PATENT DOCUMENTS

| CN | 102435442 A | 5/2012 |
| CN | 1032007090 A | 7/2013 |

* cited by examiner

*Primary Examiner* — Nicholas Kiswanto
(74) *Attorney, Agent, or Firm* — Seed IP Law Group LLP

(57) ABSTRACT

The present disclosure discloses a method and apparatus for testing operation of an unmanned vehicle. The method for testing operation of the unmanned vehicle comprises: entering a preset image in a preset image set into a vehicle-mounted controller mounted on the unmanned vehicle; acquiring an operation instruction generated by the vehicle-mounted controller based on the preset image; outputting an operation instruction testing result based on a matching result of the operation instruction and a preset operation instruction corresponding to the preset image. The present disclosure achieves simulated test of operation of the unmanned vehicle, verifies reliability of operation of the unmanned vehicle, can be easily implemented and exhibits lower costs.

18 Claims, 4 Drawing Sheets

METHOD AND APPARATUS FOR TESTING OPERATION OF UNMANNED VEHICLE

CROSS-REFERENCE TO RELATED APPLICATION

This application claims the priority of Chinese Patent Application No. 201610603327.7, entitled "Method and Apparatus For Testing Operation of Unmanned Vehicle," filed on Jul. 27, 2016, the content of which is incorporated herein by reference in its entirety.

TECHNICAL FIELD

Embodiments of the present disclosure relate to unmanned vehicle testing technologies, and particularly to a method and apparatus for testing operation of an unmanned vehicle.

BACKGROUND

An unmanned vehicle (driverless vehicle) is a smart vehicle. Unmanned driving is implemented mainly depending on a vehicle-mounted controller (a smart driving instrument with a computer system as a core) in the vehicle.

The unmanned vehicle is operated correspondingly based on road surface conditions. Operation correctness of the unmanned vehicle directly determines whether the unmanned vehicle can be used, so it is necessary to test the operation of the unmanned vehicle. A conventional testing method usually tests the unmanned vehicle at a vehicle testing site or on an actual road. However, it is costly to test the actual vehicle at the vehicle testing site or on the actual road.

SUMMARY

The present disclosure provides a method and apparatus for testing operation of an unmanned vehicle to implement test of the operation of the unmanned vehicle.

In a first aspect, embodiments of the present disclosure provide a method for testing operation of an unmanned vehicle, comprising:

entering a preset image in a preset image set into a vehicle-mounted controller mounted on the unmanned vehicle;

acquiring an operation instruction generated by the vehicle-mounted controller based on the preset image;

outputting an operation instruction testing result based on a matching result of the operation instruction and the preset operation instruction corresponding to the preset image.

In a second aspect, embodiments of the present disclosure provide an apparatus for testing operation of an unmanned vehicle, comprising:

a preset image entering module configured to enter a preset image in a preset image set into a vehicle-mounted controller mounted on the unmanned vehicle;

an operation instruction acquire module configured to acquire an operation instruction generated by the vehicle-mounted controller based on the preset image;

an operation instruction testing result output module configured to output an operation instruction testing result based on a matching result of the operation instruction and a preset operation instruction corresponding to the preset image.

With the preset image being entered into the vehicle-mounted controller to test the operation instruction generated by the vehicle-mounted controller, the technical solution of the present embodiment solves high-cost problem in real-vehicle testing in a testing site or in an actual road, and achieves an effect of lowering the costs of testing the operation of the unmanned vehicle.

DETAILED DESCRIPTION OF PREFERRED EMBODIMENTS

The present disclosure is described in further detail in conjunction with figures and embodiments. It may be appreciated that specific embodiments described here are only intended to illustrate the present disclosure, but not to limit the present disclosure. In addition, it is noticeable that for ease of description, figures only show partial structures related to the present disclosure, not all structures.

Embodiment 1

Figure 1:
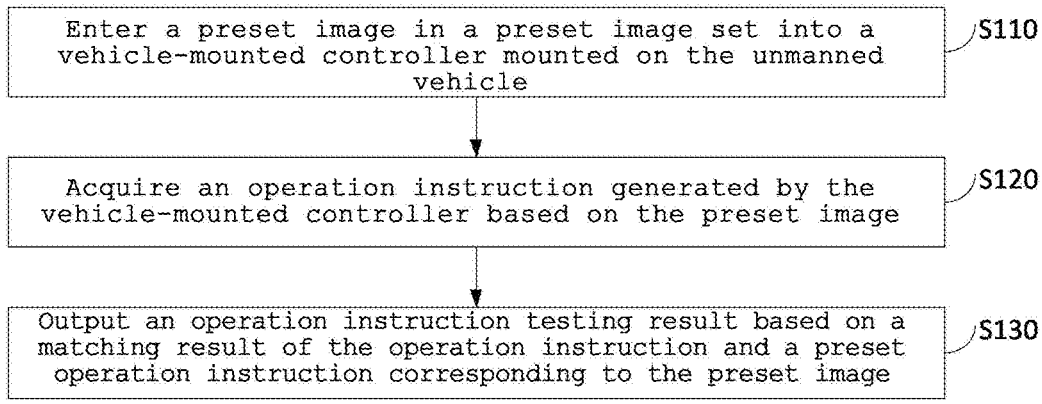
FIG. 1 is a flow chart of a method for testing operation of an unmanned vehicle according to a first embodiment of the present disclosure.

FIG. 1 is a flow chart of a method for testing operation of an unmanned vehicle according to a first embodiment of the present disclosure. The present embodiment may be adapted for the case of testing operation of the unmanned vehicle. The method may be implemented by an apparatus for testing operation of the unmanned vehicle, mounted on the unmanned vehicle. The method specifically comprises the following:

S110: entering a preset image in a preset image set into a vehicle-mounted controller mounted on the unmanned vehicle.

The vehicle-mounted controller is a set of smart driving instrument with a computer system as a core. The vehicle-mounted controller may acquire a pictorial image of a road via a vehicle-mounted camera, and generates a corresponding operation instruction based on the pictorial image acquired by the vehicle-mounted camera. Optionally, the preset image in the preset image set may be pre-collected on the road via the vehicle-mounted camera. For example, the vehicle-mounted camera is mounted on a manually-driven vehicle, the manually-driven vehicle and the unmanned vehicle are of the same model, the vehicle-mounted camera on the manually-driven vehicle is identical with the vehicle-mounted camera on the unmanned vehicle in respect of a type, a mounting position on the vehicle and an angle of pitch, the manually-driven vehicle travels on an actual road or a vehicle testing site, a pictorial image is captured via the vehicle-mounted camera, and a preset image may be obtained through automatic screening of the computer system and/or manual screening. After the preset image is obtained, a preset operation instruction corresponding to each preset image is determined. Optionally, the preset image comprises at least one of traffic light image and traffic sign image.

Furthermore, at least one preset image is enabled to form a preset image set, and the preset image set may be formed based on the content included in the preset image, e.g., the traffic sign images are enabled to form the preset image set. The preset images may be enabled to form the preset image set randomly. Optionally, the preset image set comprises a preset operation instruction corresponding to the preset image.

S120: acquiring an operation instruction generated by the vehicle-mounted controller based on the preset image.

Here, after receiving the preset image, the vehicle-mounted controller generates a corresponding operation instruction and sends it to an ECU (Electronic Control Unit) of the vehicle. The operation instruction comprises at least one of a turn-left instruction, turn-right instruction, reversing instruction and braking instruction. For example, when the red light among the traffic lights in the preset image turns on, the vehicle-mounted controller, after performing image analysis and processing, generates the braking instruction to control the unmanned vehicle to decelerate to a stop.

S130: outputting an operation instruction testing result based on a matching result of the operation instruction and the preset operation instruction corresponding to the preset image.

Here, the preset image has a corresponding preset operation instruction. After performing image analysis and processing, the vehicle-mounted controller generates the operation instruction, matches the operation instruction generated by the vehicle-mounted controller with the preset operation instruction corresponding to the preset image, records all matching results and outputs the operation instruction testing result. The operation instruction testing result comprises preset image, preset operation instruction corresponding to the preset image, the operation instruction generated by the vehicle-mounted controller based on the preset image, and the matching results. The operation instruction testing result may be a set of testing results of all preset images, or a set of testing results of preset images that fail to match, or it is feasible to output the testing result of each preset image in real-time.

With the preset image being entered into the vehicle-mounted controller to test the operation instruction generated by the vehicle-mounted controller, the technical solution of the present embodiment solves high-cost problem in real-vehicle testing in a testing site or in an actual road, and achieves an effect of lowering the costs of testing the operation of the unmanned vehicle.

Embodiment 2

Figure 2:
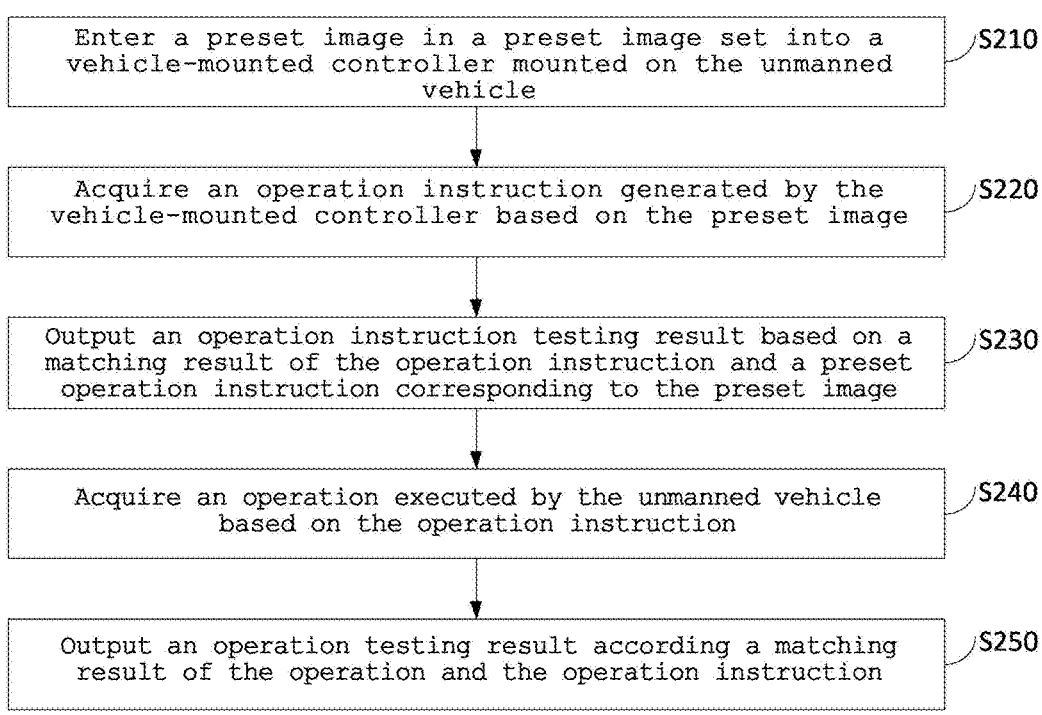
FIG. 2 is a flow chart of a method for testing operation of an unmanned vehicle according to a second embodiment of the present disclosure.

FIG. 2 is a flow chart of a method for testing operation of an unmanned vehicle based on a second embodiment of the present disclosure. The technical solution of the present embodiment is further refined on the basis of the above technical solution. The method for testing the operation of the unmanned vehicle specifically comprises:

S210: entering a preset image in a preset image set into a vehicle-mounted controller mounted on the unmanned vehicle.

S220: acquiring an operation instruction generated by the vehicle-mounted controller based on the preset image.

S230: outputting an operation instruction testing result based on a matching result of the operation instruction and the preset operation instruction corresponding to the preset image.

S240: acquiring an operation executed by the unmanned vehicle based on the operation instruction.

Here, after the vehicle-mounted controller sends the operation instruction to the ECU of the vehicle, the ECU controls a relevant execution mechanism of the unmanned vehicle to complete a corresponding operation. For example, the vehicle-mounted controller generates a braking instruction based on the traffic light image, and sends it to the ECU. If the ECU normally executes the braking instruction of the vehicle-mounted controller, the ECU controls braking calipers to clamp a braking disc to complete the braking operation.

S250: outputting an operation testing result according a matching result of the operation and the operation instruction.

Here, match the operation executed by the unmanned vehicle according to the operation instruction and the operation instruction generated by the vehicle-mounted controller, record all matching results and output an operation testing result. The operation testing result comprises: the operation instruction generated by the vehicle-mounted controller based on the preset image, the operation executed by the unmanned vehicle according to the operation instruction, and the matching result of the operation and the operation instruction. The operation testing result may be a set of testing results of all operation instructions, or a set of testing results of operation instructions that fail to match, or it is feasible to output the testing result of each operation instruction in real-time.

It is appreciated that after S220, the order of executing S230 and S240 and S250 may not be sequential.

Figure 3:
FIG. 3 is a schematic view of a preset image in the second embodiment of the present disclosure.

Exemplarily, the preset image is entered into the vehicle-mounted controller. In the preset image is as shown in FIG. 3, the red light of the traffic lights turns on, the preset operation instruction corresponding to the preset image is a braking instruction. If the operation instruction generated by the vehicle-mounted controller based on the preset image is the braking instruction, it successfully matches with the preset operation instruction; if the operation instruction generated by the vehicle-mounted controller based on the preset image is other operation instructions rather than the braking instruction, it fails to match with the preset operation instruction. The operation instruction testing result of the preset image is recorded in a job log. The operation instruction testing result comprises preset image, preset operation instruction corresponding to the preset image, the matching result of the operation instruction generated by the vehicle-mounted controller based on the preset image and the operation instruction. Furthermore, if the operation executed by the unmanned vehicle based on the operation instruction generated by the vehicle-mounted controller is a braking operation, the operation successfully matches with the operation instruction; if the operation executed by the unmanned vehicle based on the operation instruction generated by the vehicle-mounted controller is other operations rather than the braking operation, the operation fails to match with the operation instruction. The operation testing result is recorded in a job log. The operation testing result comprises the operation instruction generated by the vehicle-mounted controller, the operation executed by the unmanned vehicle, and a matching result of the operation and the operation instruction.

In the technical solution of the present embodiment, after the operation instruction testing is performed, execution of the operation instruction by the unmanned vehicle is further tested to implement test of accuracy of the unmanned vehicle's execution of the operation.

Embodiment 3

Figure 4:
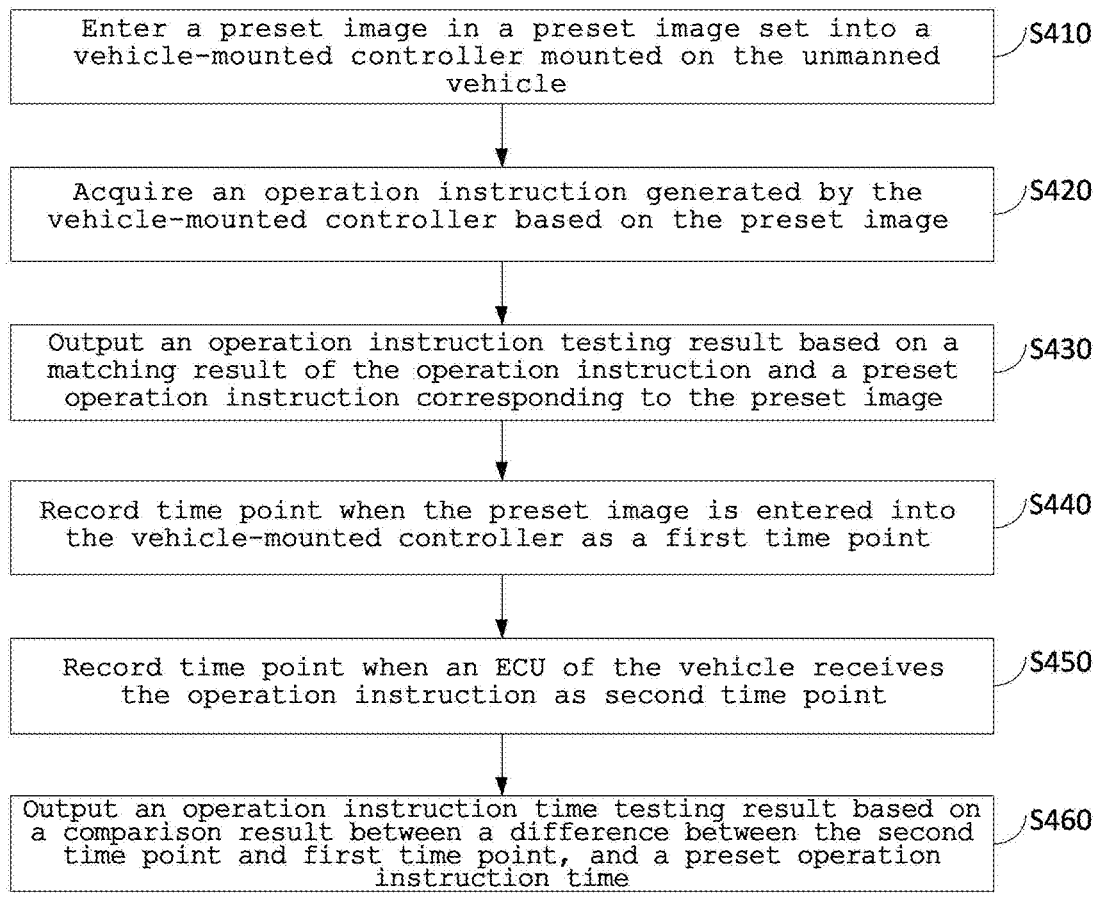
FIG. 4 is a flow chart of a method for testing operation of an unmanned vehicle according to a third embodiment of the present disclosure.

FIG. 4 is a flow chart of a method for testing operation of an unmanned vehicle according to a third embodiment of the present disclosure. The technical solution of the present embodiment is further refined on the basis of the above technical solutions. The method for testing the operation of the unmanned vehicle specifically comprises:

S410: entering a preset image in a preset image set into a vehicle-mounted controller mounted on the unmanned vehicle.

S420: acquiring an operation instruction generated by the vehicle-mounted controller based on the preset image.

S430: outputting an operation instruction testing result based on a matching result of the operation instruction and the preset operation instruction corresponding to the preset image.

S440: recording a time point when the preset image is entered into the vehicle-mounted controller as a first time point.

Here, an approach to record the first time point may be a timestamp put in the job log and corresponding to the time point when the preset image is entered into the vehicle-mounted controller.

S450: recording a time point when the ECU of the vehicle receives the operation instruction as second time point.

Here, the time point when the ECU of the vehicle receives the operation instruction is also recorded in a fashion by putting a corresponding timestamp in the job log.

S460: outputting an operation instruction time testing result based on a comparison result between a difference between the second time point and first time point, and a preset operation instruction.

Here, the difference between the second time point and a first time point is the time point when the vehicle-mounted controller successfully issues a corresponding operation instruction based on the entered preset image. The time point when the vehicle-mounted controller successfully sends a corresponding operation instruction based on the entered preset image is compared with the preset operation instruction time. When the time for the vehicle-mounted controller to successfully send a corresponding operation instruction based on the entered preset image is greater than the preset operation instruction time, it is believed that of the instruction sent by the vehicle-mounted controller for the preset image does not meet the system requirement in real-time. Otherwise, it is believed that the instruction sent by the vehicle-mounted controller for the preset image meets the system requirement in real-time. Exemplarily, the preset operation instruction time may be selected as 150 milliseconds, 200 milliseconds or 300 milliseconds. The operation instruction time testing results may be results of testing of operation instruction time for all preset images, or only record results of testing of operation instruction time that the difference between the second time point and the first time point is greater than the preset operation instruction time. Optionally, the output operation instruction time testing results comprise: the first time point, the second time point, corresponding preset images and preset operation instruction time, and are recorded in the job log in real-time.

It is appreciated that after S410, the order of executing S420 and S430 and S440, S450 and S460 may not be sequential.

By calculating the time point when the vehicle-mounted controller successfully sends a corresponding operation instruction based on the entered preset image, the technical solution achieves the test of real-time of the unmanned vehicle operation instruction.

Embodiment 4

Figure 5:
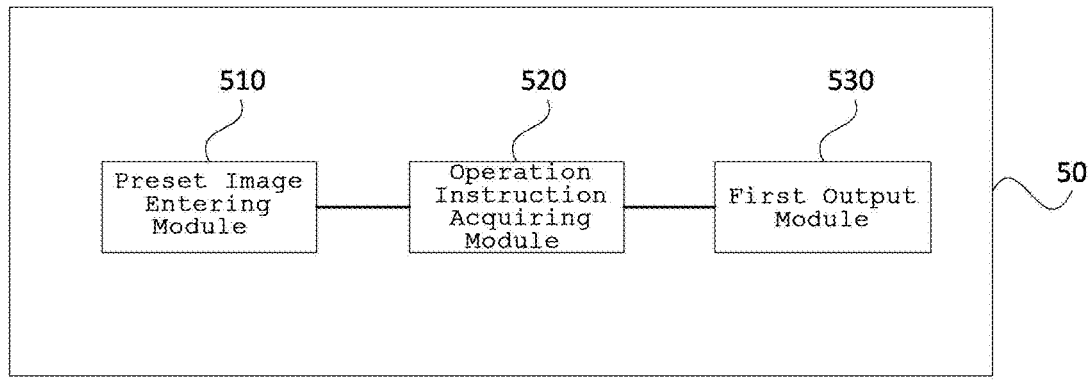
FIG. 5 is a structural schematic view of an apparatus for testing operation of an unmanned vehicle according to a fourth embodiment of the present disclosure.

FIG. 5 is a structural schematic view of an apparatus for testing operation of an unmanned vehicle according to a fourth embodiment of the present disclosure. The apparatus 50 for testing operation of an unmanned vehicle comprises:

a preset image entering module 510 configured to enter a preset image in a preset image set into a vehicle-mounted controller mounted on the unmanned vehicle;

an operation instruction acquiring module 520 configured to acquire an operation instruction generated by the vehicle-mounted controller based on the preset image;

a first output module 530 configured to output an operation instruction testing result based on a matching result of the operation instruction and the preset operation instruction corresponding to the preset image.

Here the preset image has a corresponding preset operation instruction. After performing image analysis and processing, the vehicle-mounted controller generates the operation instruction, matches the operation instruction generated by the vehicle-mounted controller with the preset operation instruction corresponding to the preset image, records all matching results and outputs the operation instruction testing result.

Optionally, the operation instruction comprises at least one of a turn-left instruction, turn-right instruction, reversing instruction and braking instruction.

Optionally, the preset image is collected on the road via a vehicle-mounted camera.

Optionally, the preset image comprises at least one of traffic light image and traffic sign image.

With the preset image being entered into the vehicle-mounted controller to test the operation instruction generated by the vehicle-mounted controller, the technical solution of the present embodiment solves high-cost problem in real-vehicle testing in a testing site or in an actual road, and achieves an effect of lowering the costs of testing the operation of the unmanned vehicle.

Embodiment 5

Figure 6:
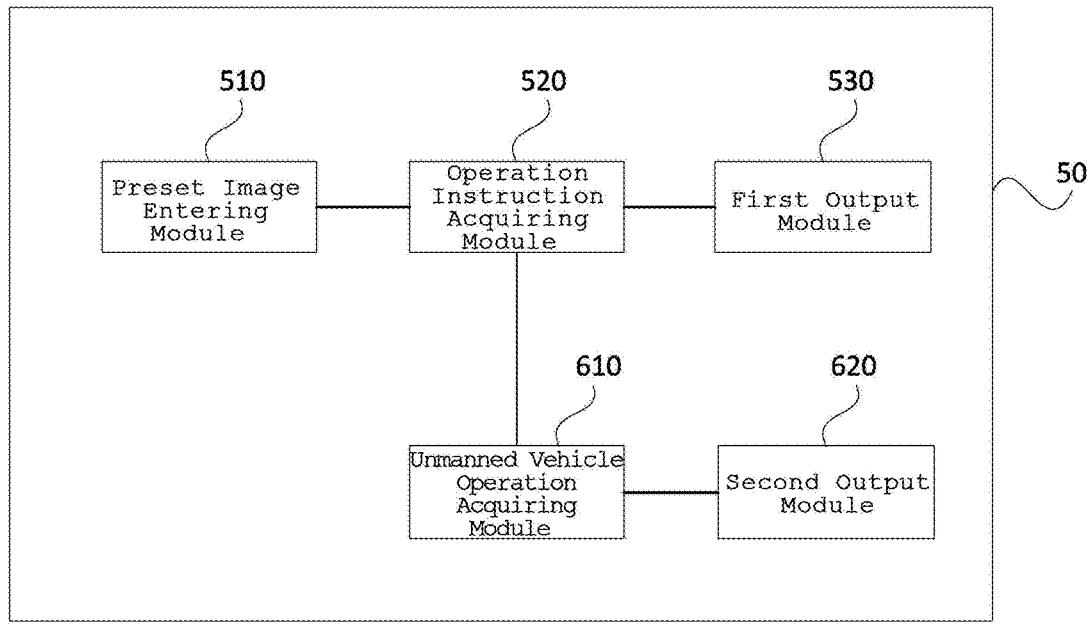
FIG. 6 is a structural schematic view of an apparatus for testing operation of an unmanned vehicle according to a fifth embodiment of the present disclosure.

FIG. 6 is a structural schematic view of an apparatus for testing operation of an unmanned vehicle according to a fifth embodiment of the present disclosure. The technical solution of the present embodiment is further refined on the basis of the fourth embodiment. The apparatus 50 for testing operation of an unmanned vehicle comprises:

an unmanned vehicle operation acquiring module 610 configured to acquire an operation executed by the unmanned vehicle according to the operation instruction;

a second output module 620 configured to output an operation testing result based on a matching result of the operation and the operation instruction.

Here, after the vehicle-mounted controller sends the operation instruction to the ECU of the vehicle, the ECU controls a relevant execution mechanism of the unmanned vehicle to complete a corresponding operation. The operation executed by the unmanned vehicle based on the operation instruction is matched with operation instruction generated by the vehicle-mounted controller, all matching results are recorded and an operation testing result is output.

In the technical solution of the present embodiment, after the operation instruction testing is performed, execution of the operation instruction by the unmanned vehicle is further tested to implement test of accuracy of the unmanned vehicle's execution of the operation.

Embodiment 6

Figure 7:
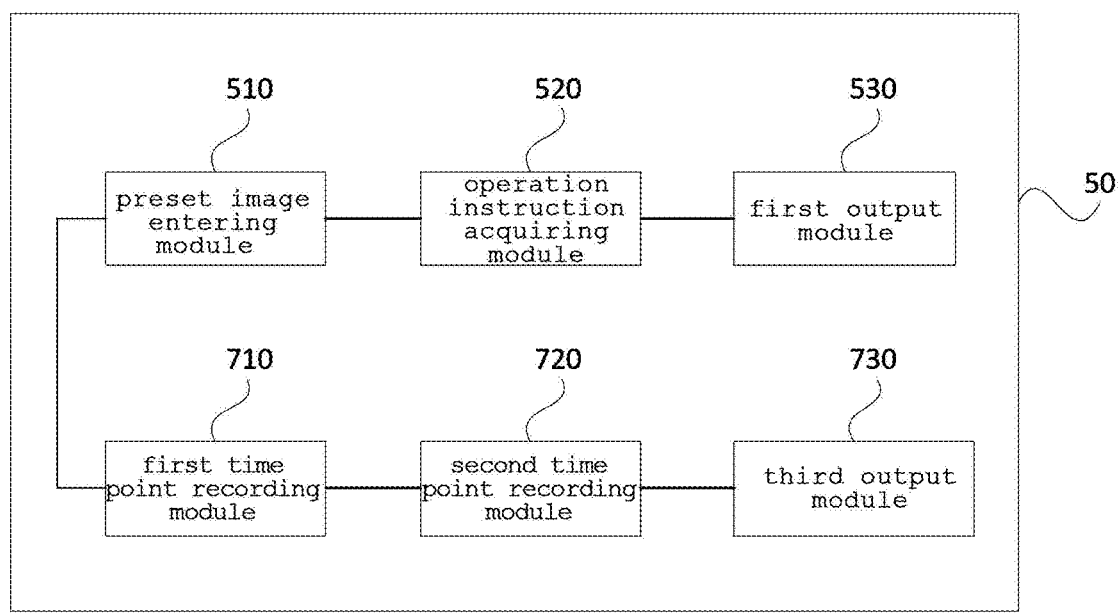
FIG. 7 is a structural schematic view of an apparatus for testing operation of an unmanned vehicle according to a sixth embodiment of the present disclosure.

FIG. 7 is a structural schematic view of an apparatus for testing operation of an unmanned vehicle according to a sixth embodiment of the present disclosure. The technical solution of the present embodiment is further refined on the basis of the above embodiment. The apparatus 50 for testing operation of an unmanned vehicle comprises:

a first time point recording module 710 configured to record a time point when the preset image is entered into the vehicle-mounted controller as a first time point;

a second time point recording module 720 configured to record a time point when the ECU mounted on the vehicle receives the operation instruction as a second time point;

a third output module 730 configured to output an operation instruction time testing result based on a comparison result between a difference between the second time point and the first time point, and a preset operation instruction time.

By calculating the time point when the vehicle-mounted controller successfully sends a corresponding operation instruction based on the entered preset image, the technical solution achieves the test of real-time of the unmanned vehicle operation instruction.

The above products may implement the method provided by any embodiment of the present disclosure, and has corresponding function modules performing steps of the method and exhibits advantageous effects.

It is appreciated that the above are only preferred embodiments of the present disclosure and utilized technical principles. Those skilled in the art appreciate that the present disclosure is not limited to specific embodiments described here. Those skilled in the art may make various obvious variations, re-adjustments and substitutions without departing from the protection scope of the present disclosure. Hence, although the present disclosure is described in detail with the above embodiments, the present disclosure is not merely limited to the above embodiments, and it, without departing from the ideas of the present disclosure, may further comprise more other equivalent embodiments. The scope of the present disclosure is defined by the appended claims.

What is claimed is:

1. A method for testing operation of an unmanned vehicle, the method comprising:
   entering a preset image in a preset image set into a vehicle-mounted controller mounted on the unmanned vehicle;
   acquiring an operation instruction generated by the vehicle-mounted controller based on the preset image;
   testing the operation instruction generated by the vehicle-mounted controller by matching the operation instruction generated by the vehicle-mounted controller with a preset operation instruction corresponding to the preset image; and
   outputting an operation instruction testing result based on a matching result of the operation instruction generated by the vehicle-mounted controller and the preset operation instruction corresponding to the preset image.

2. The method according to claim 1, wherein the operation instruction generated by the vehicle-mounted controller comprises at least one of: a turn-left instruction, a turn-right instruction, a reversing instruction and a braking instruction.

3. The method according to claim 1, wherein the preset image is collected on a road via a vehicle-mounted camera.

4. The method according to claim 1, wherein the preset image comprises at least one of a traffic light image and a traffic sign image.

5. The method according to claim 1, wherein after acquiring an operation instruction generated by the vehicle-mounted controller based on the preset image, the method further comprises:
   acquiring an operation executed by the unmanned vehicle according to the operation instruction generated by the vehicle-mounted controller;
   matching the operation executed by the unmanned vehicle with the operation instruction generated by the vehicle-mounted controller; and
   outputting an operation testing result based on a matching result of the operation and the operation instruction generated by the vehicle-mounted controller.

6. The method according to claim 1, wherein after entering the preset image in the preset image set into the vehicle-mounted controller mounted on the unmanned vehicle, the method further comprises:
   recording a time point when the preset image is entered into the vehicle-mounted controller as a first time point;
   recording a time point when the vehicle-mounted controller mounted on the vehicle receives the operation instruction as a second time point;
   comparing a difference between the second time point and the first time point, and a preset operation instruction time; and
   outputting an operation instruction time testing result based on a comparison result between the difference between the second time point and the first time point, and the preset operation instruction time.

7. An apparatus for testing operation of an unmanned vehicle, wherein the apparatus comprises:
   at least one processor; and
   a memory storing instructions, which when executed by the at least one processor, cause the at least one processor to perform operations, the operations comprising:
   entering a preset image in a preset image set into a vehicle-mounted controller mounted on the unmanned vehicle;
   acquiring an operation instruction generated by the vehicle-mounted controller based on the preset image;
   testing the operation instruction generated by the vehicle-mounted controller by matching the operation instruction generated by the vehicle-mounted controller with a preset operation instruction corresponding to the preset image; and
   outputting an operation instruction testing result based on a matching result of the operation instruction generated by the vehicle-mounted controller and the preset operation instruction corresponding to the preset image.

8. The apparatus according to claim 7, wherein the operation instruction generated by the vehicle-mounted controller comprises at least one of a turn-left instruction, turn-right instruction, reversing instruction and braking instruction.

9. The apparatus according to claim 7, wherein the preset image is collected on a road via a vehicle-mounted camera.

10. The apparatus according to claim 7, wherein the preset image comprises at least one of traffic light image and traffic sign image.

11. The apparatus according to claim 7, the operations further comprising:
acquiring an operation executed by the unmanned vehicle based on the operation instruction generated by the vehicle-mounted controller;
matching the operation executed by the unmanned vehicle with the operation instruction generated by the vehicle-mounted controller; and
outputting an operation testing result based on a matching result of the operation and the operation instruction generated by the vehicle-mounted controller.

12. The apparatus according to claim 7, the operations further comprising:
recording a time point when the preset image is entered into the vehicle-mounted controller as a first time point;
recording a time point when an ECU mounted on the vehicle receives the operation instruction as a second time point;
comparing a difference between the second time point and the first time point, and a preset operation instruction time; and
outputting an operation instruction time testing result based on a comparison result between the difference between the second time point and the first time point, and the preset operation instruction time.

13. A non-transitory computer storage medium storing a computer program, which when executed by one or more processors, cause the one or more processors to perform operations, the operations comprising:
entering a preset image in a preset image set into a vehicle-mounted controller mounted on an unmanned vehicle;
acquiring an operation instruction generated by the vehicle-mounted controller based on the preset image;
testing the operation instruction generated by the vehicle-mounted controller by matching the operation instruction generated by the vehicle-mounted controller with a preset operation instruction corresponding to the preset image; and
outputting an operation instruction testing result based on a matching result of the operation instruction generated by the vehicle-mounted controller and the preset operation instruction corresponding to the preset image.

14. The non-transitory computer storage medium according to claim 13, wherein the operation instruction generated by the vehicle-mounted controller comprises at least one of: a turn-left instruction, a turn-right instruction, a reversing instruction and a braking instruction.

15. The non-transitory computer storage medium according to claim 13, wherein the preset image is collected on a road via a vehicle-mounted camera.

16. The non-transitory computer storage medium according to claim 13, wherein the preset image comprises at least one of a traffic light image and a traffic sign image.

17. The non-transitory computer storage medium according to claim 13, wherein after acquiring an operation instruction generated by the vehicle-mounted controller based on the preset image, the operations further comprise:
acquiring an operation executed by the unmanned vehicle according to the operation instruction generated by the vehicle-mounted controller;
matching the operation executed by the unmanned vehicle with the operation instruction generated by the vehicle-mounted controller; and
outputting an operation testing result based on a matching result of the operation and the operation instruction generated by the vehicle-mounted controller.

18. The non-transitory computer storage medium according to claim 13, wherein after entering the preset image in the preset image set into the vehicle-mounted controller mounted on the unmanned vehicle, the operations further:
recording a time point when the preset image is entered into the vehicle-mounted controller as a first time point;
recording a time point when the vehicle-mounted controller mounted on the vehicle receives the operation instruction as a second time point;
comparing a difference between the second time point and the first time point, and a preset operation instruction time; and
outputting an operation instruction time testing result based on a comparison result between the difference between the second time point and the first time point, and the preset operation instruction time.

\* \* \* \* \*

UNITED STATES PATENT AND TRADEMARK OFFICE
CERTIFICATE OF CORRECTION

PATENT NO. : 10,580,227 B2
APPLICATION NO. : 15/424074
DATED : March 3, 2020
INVENTOR(S) : Hong Zhai It is certified that error appears in the above-identified patent and that said Letters Patent is hereby corrected as shown below:

On the Title Page

Item (56), References Cited, Foreign Patent Documents:
"CN 1032007090 A 7/2013" should read --CN 103207090 A 7/2013--.

Signed and Sealed this
Second Day of February, 2021

Drew Hirshfeld
*Performing the Functions and Duties of the
Under Secretary of Commerce for Intellectual Property and
Director of the United States Patent and Trademark Office*